(12) United States Patent
Perdue

(10) Patent No.: US 7,661,501 B1
(45) Date of Patent: Feb. 16, 2010

(54) VEHICLE OPERATED BY MULTIPLE POWER SOURCES

(76) Inventor: Joab Jay Perdue, P.O. Box 231, Erin, TN (US) 37061

( * ) Notice: Subject to any disclaimer, the term of this patent is extended or adjusted under 35 U.S.C. 154(b) by 2 days.

(21) Appl. No.: 12/283,687

(22) Filed: Sep. 16, 2008

(51) Int. Cl.
*B62D 61/06* (2006.01)

(52) U.S. Cl. .................. 180/210; 180/205; 180/2.1; 280/210; 280/267; 280/282; 280/259

(58) Field of Classification Search ............... 180/205, 180/2.1, 210; 280/267, 282, 259, 210
See application file for complete search history.

(56) References Cited

U.S. PATENT DOCUMENTS

| | | | |
|---|---|---|---|
| 3,913,929 A | 10/1975 | Matsuura | |
| 4,111,274 A | 9/1978 | King | |
| 4,410,198 A | 10/1983 | Fernandez | |
| 4,456,277 A * | 6/1984 | Carpenter | 280/282 |
| 4,744,577 A | 5/1988 | Brent | |
| 5,036,937 A | 8/1991 | Tanaka | |
| 5,691,584 A | 11/1997 | Toida | |
| 5,762,351 A * | 6/1998 | SooHoo | 280/267 |
| 5,853,062 A * | 12/1998 | Hulett | 180/206 |
| 6,015,022 A | 1/2000 | Thuliez | |
| 6,035,970 A | 3/2000 | Conte | |
| 6,100,615 A | 8/2000 | Birkestrand | |
| 6,158,542 A * | 12/2000 | Nolet | 180/206 |
| 6,296,072 B1 | 10/2001 | Turner | |
| 6,320,336 B1 | 11/2001 | Eguchi | |
| 6,342,769 B1 | 1/2002 | Birkestrand | |
| 6,355,996 B1 | 3/2002 | Birkestrand | |
| 6,402,174 B1 * | 6/2002 | Maurer | 280/267 |
| 6,557,877 B2 | 5/2003 | Dunkley | |
| 6,686,719 B2 | 2/2004 | Cochoy | |
| 6,724,165 B2 | 4/2004 | Hughes | |
| 6,874,592 B2 | 4/2005 | Yokotani | |
| 6,948,581 B2 * | 9/2005 | Fecteau et al. | 180/210 |
| 6,957,129 B2 | 10/2005 | Hatanaka | |
| 6,974,399 B2 | 12/2005 | Lo | |
| 7,017,685 B2 * | 3/2006 | Schoenberg | 180/2.1 |
| 7,487,985 B1 * | 2/2009 | Mighell | 280/124.103 |
| 2002/0047245 A1 * | 4/2002 | Greene et al. | 280/259 |
| 2008/0093913 A1 * | 4/2008 | Katsaros | 301/1 |
| 2008/0115988 A1 * | 5/2008 | Holland | 180/65.6 |

* cited by examiner

*Primary Examiner*—Lesley Morris
*Assistant Examiner*—Tashiana Adams
(74) *Attorney, Agent, or Firm*—Norman B. Rainer

(57) ABSTRACT

An economically operated low cost wheeled vehicle that accommodates a single driver occupant is propelled by power provided by a controllable combination of pedaling action of the driver, an internal combustion engine and an electric motor. The vehicle is elongated upon a center axis between a front extremity and a rear extremity having a single, axially centered wheel that drives the vehicle.

10 Claims, 5 Drawing Sheets

VEHICLE OPERATED BY MULTIPLE POWER SOURCES

BACKGROUND OF THE INVENTION

1. Field of the Invention

This invention relates to motor vehicles, and more particularly concerns a wheeled motor vehicle which is of low cost and is economical to operate.

2. Description of the Prior Art

In view of the ever increasing cost of gasoline, considerable attention has been directed toward the development of "hybrid" vehicles which include a battery powered electric motor that supplements a gasoline engine of generally smaller size than might otherwise be employed for the vehicle. The primary function of the engine is to augment the power provided by the electric motor when additional power is needed, as in acceleration and hill-climbing. The battery is generally re-charged either by a generator which is driven by the vehicle's engine, or by overnight plug-in to a stationary terminal supplied with electrical power.

Another method for re-charging the battery is to employ the vehicle's momentum during braking to operate a generator which feeds electrical current to the battery. Such system is disclosed in U.S. Pat. No. 6,724,165 and elsewhere.

The use of a driver-operated pedaling mechanism to augment the vehicle's power system while driving is disclosed in U.S. Pat. Nos. RE31156 and 6,260,649.

In low cost vehicles that utilize electrical propulsive power, manufacturing economy and compactness of design can be achieved by incorporating the electric motor into the hub of a driving wheel. Such driving wheels, employed with hub motors, are generally centered upon the longitudinal axis of the vehicle, as in straddle-type two-wheeled vehicles and three-wheeled vehicles having a single rear wheel. Typical hub motors, as described in U.S. Pat. Nos. 6,974,399; 6,296,072 and 5,691,584 include a stator secured to the vehicle frame, and an interactive rotor mechanically adapted to rotate the driving wheel.

Although the aforesaid innovations are intended to improve fuel economy in a vehicle driven by a gasoline engine, the implementation of such innovations generally results in a vehicle of considerable complexity whose cost outweighs the potential savings in gasoline consumption.

It is accordingly an object of the present invention to provide a vehicle whose primary propulsion power is supplied by a gasoline engine, and said power is augmented by a battery operated electric motor.

It is a still further object of this invention to provide a vehicle of the aforesaid nature having a driver-operated pedaling mechanism which, by way of suitable gearing directly contributes to the propulsion of the vehicle.

It is an additional object of the present invention to provide a vehicle of the aforesaid nature having hand activated operating controls, thereby freeing the operator's feet for pedaling.

It is yet another object of this invention to provide a vehicle of the aforesaid nature amenable to low cost manufacture.

These objects and other objects and advantages of the invention will be apparent from the following description.

SUMMARY OF THE INVENTION

The above and other beneficial objects and advantages are accomplished in accordance with the present invention by a vehicle which accommodates a seated driver and extends upon a longitudinal center axis between front and rear extremities of a rigid framework that secures a wheel centered upon said axis at said rear extremity and adapted to rotate upon a horizontally oriented axle. In a preferred embodiment, said axle is equipped with an electric motor, and the vehicle has a powertrain comprised of:

a) a rechargeable storage battery which supplies electrical power to said motor, b) an electronic controller which, in a first mode of function regulates the amount of electrical power routed to said motor, and in a second mode of function causes the motor to produce braking of the vehicle with attendant generation of electricity which is fed to the battery, c) a pedaling mechanism operable by said driver to produce motive power, d) a gasoline engine which produces motive power, and e) a transmission system which accumulates the power from said pedaling mechanism and engine, and causes said accumulated power to drive said centered wheel to propel the vehicle.

In a further preferred embodiment, shock-absorbing means are associated with said axle to ameliorate the consequence of torque force received by said axle during braking.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
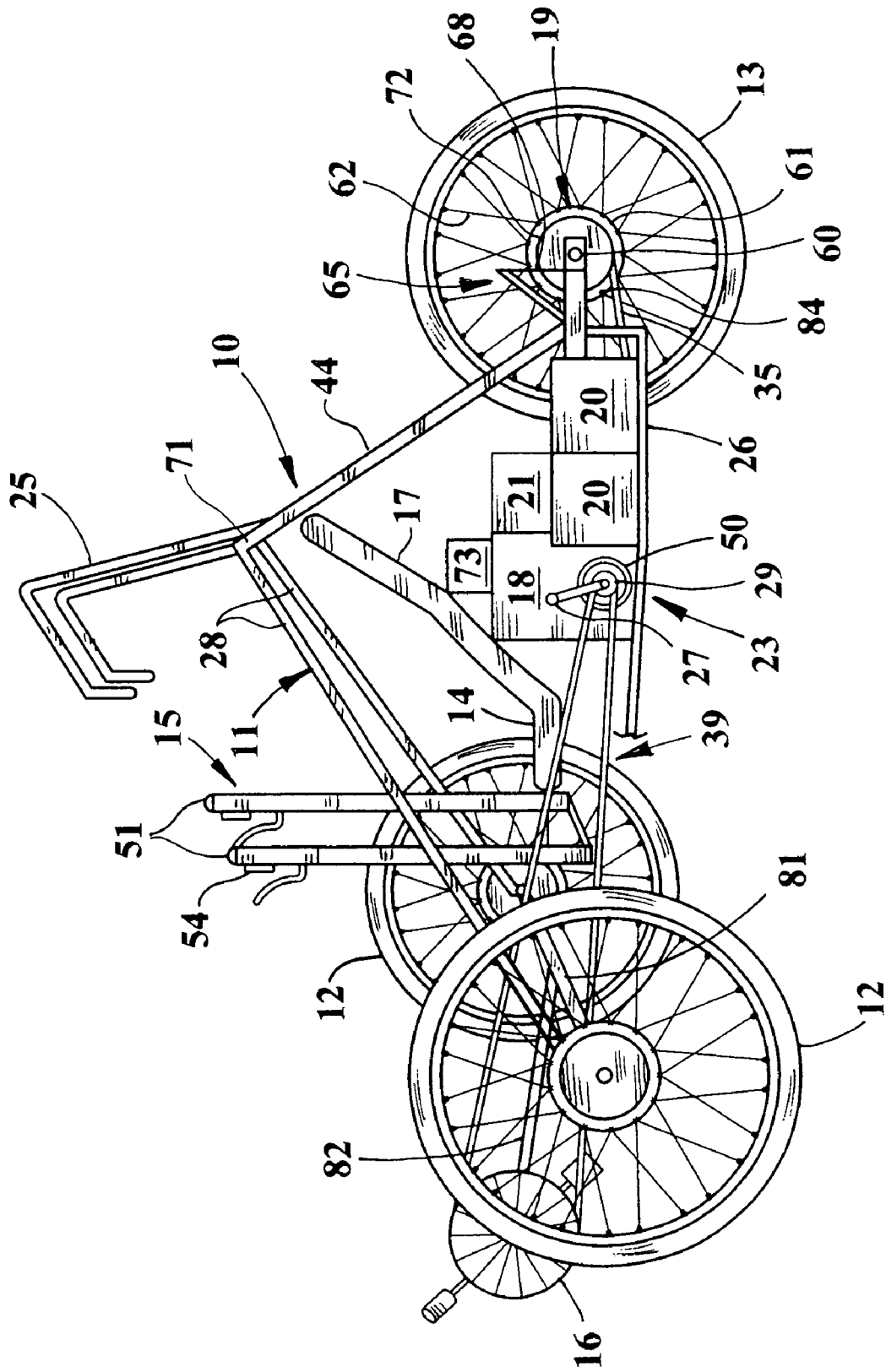
FIG. 1 is a perspective view of the left side of a tricycle embodiment of the vehicle of the present invention.
Figure 2:
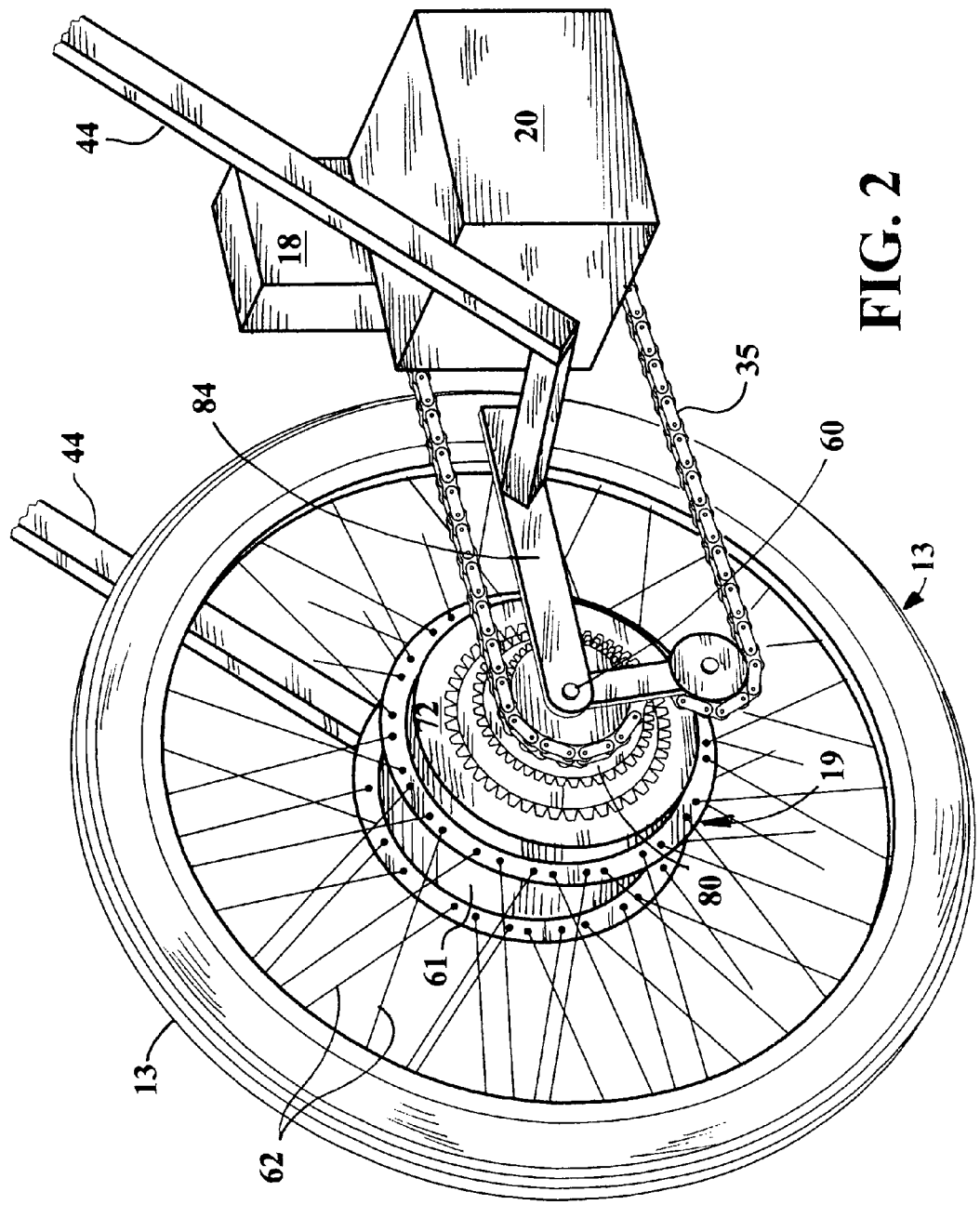
FIG. 2 is an enlarged fragmentary perspective view of the rear right side of the tricycle embodiment of FIG. 1.
Figure 3:
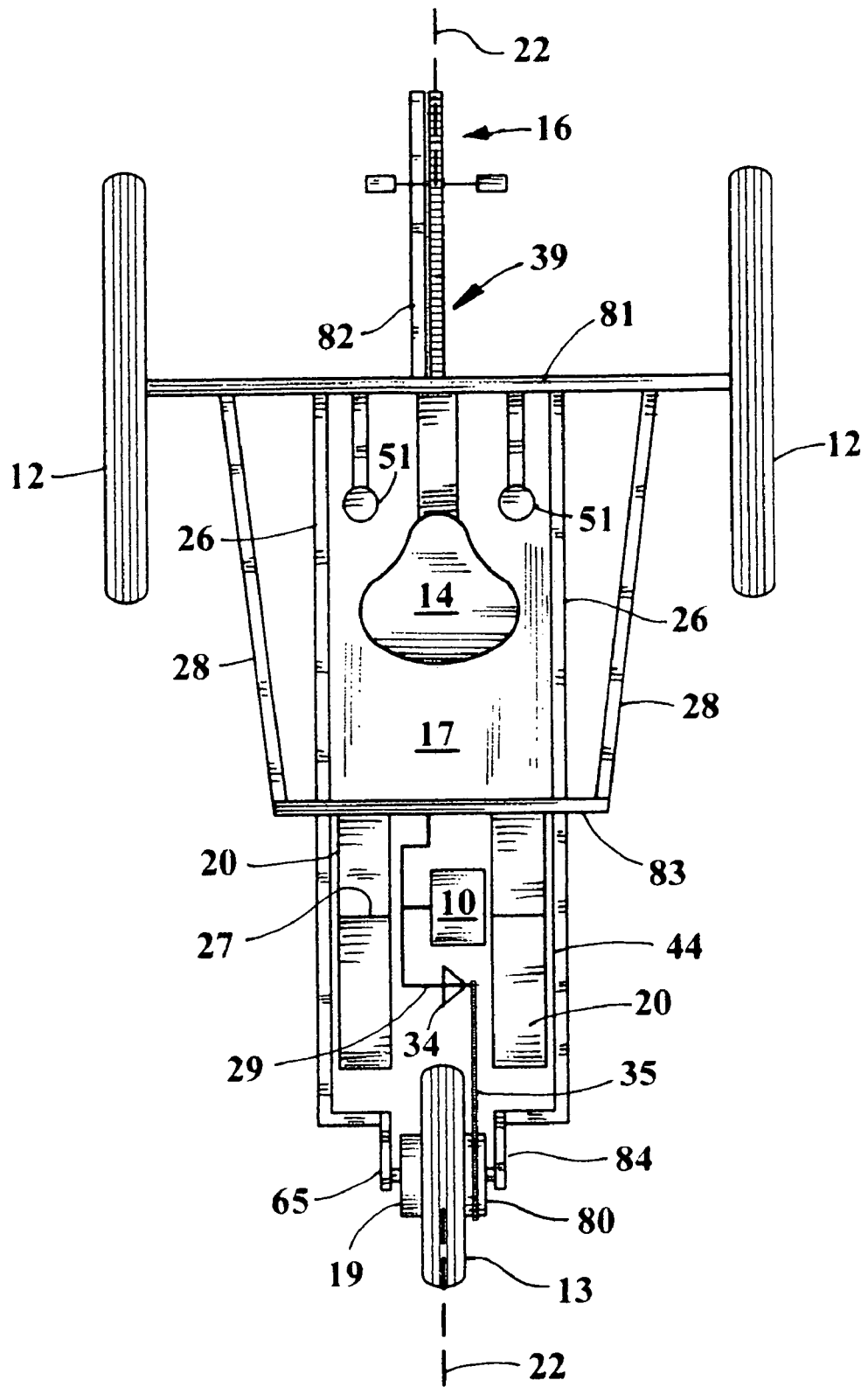
FIG. 3 is a top view of the embodiment of FIG. 1.

Referring now to FIGS. 1-3, a tricycle embodiment of the vehicle 10 of the present invention is shown having a chassis framework 11 comprised of: elongated bottom beams 26 extending longitudinally between front and rear portions of the vehicle in paired opposition about a center axis 22; a transverse front yoke 81 attached to beams 26; an extension beam 82 forwardly emergent from yoke 81 upon axis 22; an upper transverse bracing strut 83; paired forward bracing members 28 inclined between strut 83 and yoke 81 in joinder therewith; and paired rearward bracing members 44 inclined between strut 83 and transverse rear yoke means 84 in joinder therewith. Said manner of bracing causes strut 83 to represent an apex feature positioned about 2¼ to 3¼ feet above bottom beams 26. Paired "roll bars" 25 may extend upwardly from strut 83 for protection of the driver. Components of framework 11 are preferably fabricated of tubular steel in order to minimize overall weight of the vehicle.

Paired free-wheeling front wheels 12 are associated with front yoke 81. A rear driving wheel 13 is secured by yoke means 84 and centered upon axis 22. Framework 11 further supports driver's seat 14 with backrest 17, steering control system 15 mounted forwardly of said seat, and power train 23. The vehicle also contains, or may be made to contain other commonly employed vehicle components such as braking means, front and rear lights, gauges, horn, rear view mirrors, engine exhaust system, operating linkages, crash protection means and spring suspensions. A weather proof enclosure may be disposed above seat 14 in association with roll bar 25.

Said power train is comprised of a gasoline operated engine 18, an electrically operated hub motor 19 installed in wheel 13, storage batteries 20, transmission system 50 and pedaling mechanism 16 positioned forwardly of front wheels 12. An electronic controller 73 is interactive between said batteries and hub motor.

In the tricycle embodiment of the vehicle, the spacing of the two front wheels is between 34 and 64 inches. The diameter of said wheels is between 20 and 26 inches, the axially measured distance between front and rear wheels is between 4 and 10 feet, and the ratio of front wheel spacing to the axial distance between front and rear wheels is preferably between 0.6 and 0.8. The overall weight of the vehicle, inclusive of the driver, is such that about 60% is forward of the mid-length of the vehicle. Such features of construction contribute to the stability of the tricycle in turning.

Figure 7:
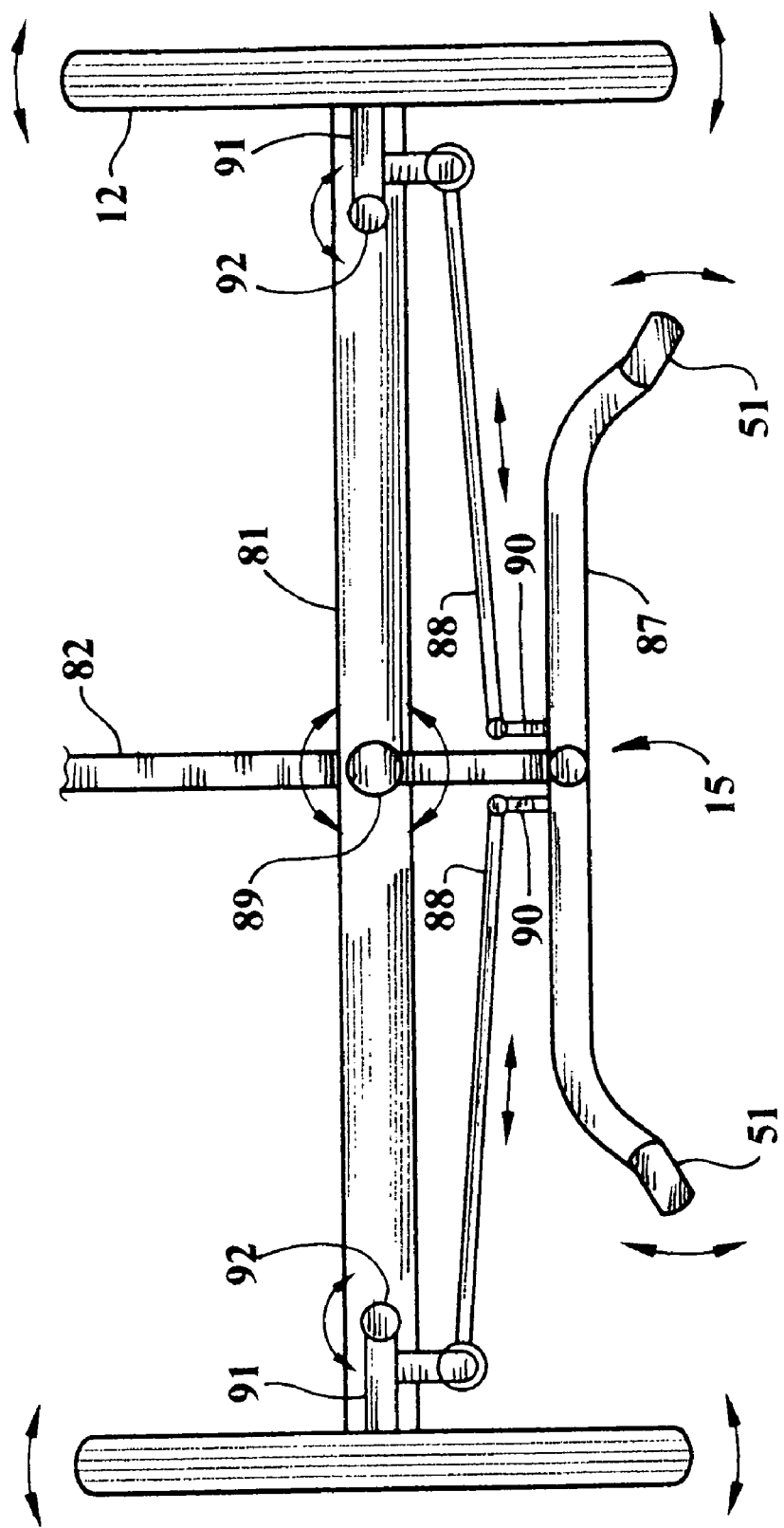
FIG. 7 is a top schematic view of a steering system for the tricycle embodiment of FIG. 1.

The exemplified embodiment of steering control system 15, is comprised of paired upright posts 51 adapted to be vertically gripped by the driver's hands and operated in a push/pull manner to produce pivoted movement of the front wheels by way of mechanical couplings. As best shown in FIG. 7, posts 51 extend downwardly to connecting bar 87 mounted on pivot bearing 89 and having arms 90 that pivotably engage opposing drive rods 88. Any push or pull movement of posts 51 causes rods 88 to pivotably act upon stub axles 91 which are rotatable about vertical pivot posts 92 positioned upon yoke 81, and such action produces synchronous turning of wheels 12.

Posts 51 contain the several control features for proper operation of the vehicle, including speed regulating means interactive with said electronic controller, a momentary braking button 54 interactive with said electronic controller, gear shifting means interactive with said rear wheel, hand brakes and signal light control switches. Because the controls for the operation of the vehicle are hand-operated, the driver's feet are available for pedalling. In other embodiments, the steering control system may be in the form of a conventional handlebar or steering wheel.

Figure 5:
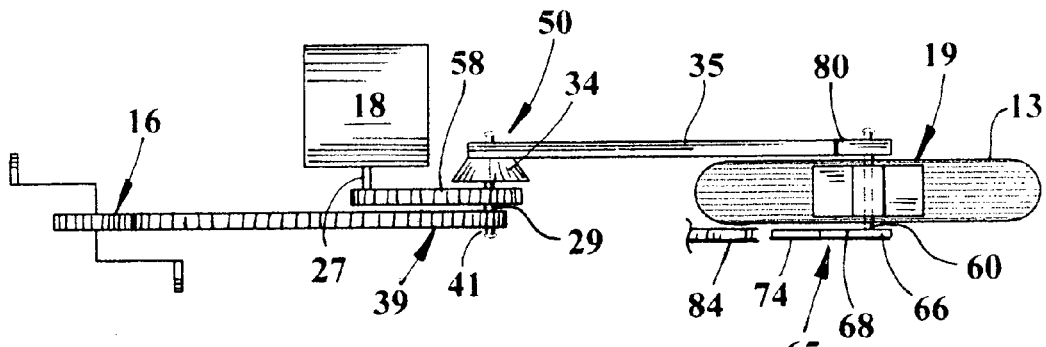
FIG. 5 is a schematic top view of a transmission system useful in the vehicle of the present invention.
Figure 6:
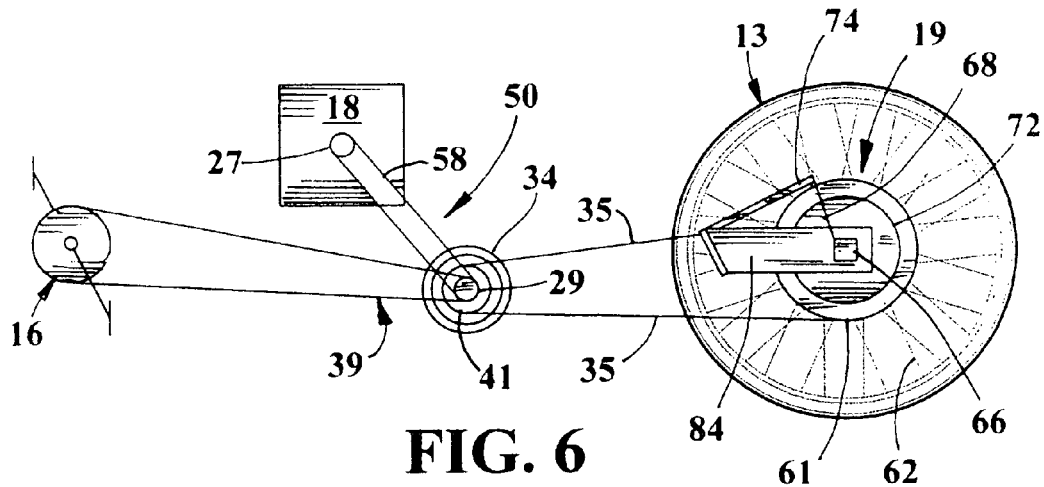
FIG. 6 is a schematic side view of the transmission system of FIG. 5.

Gasoline engine 18, preferably of standard single cylinder 4 cycle design has a power rating in the range of about 1.5 to 17.0 horsepower. As best shown in FIGS. 5 and 6, an output shaft 27 emergent from engine 18 is coupled by chain and sprocket assembly 58 to jack shaft 29 of said transmission system.

Figure 4:
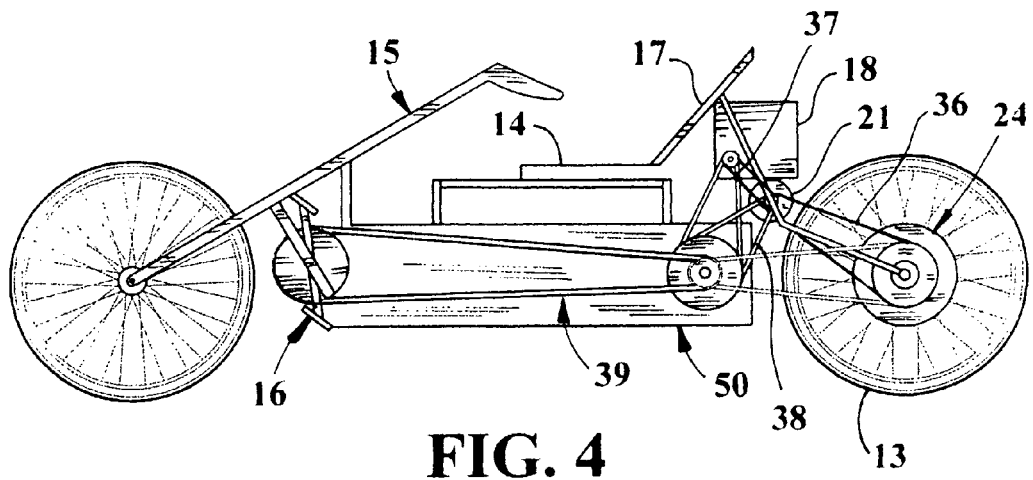
FIG. 4 is a side view of a motorcycle embodiment of the vehicle of the present invention.

Hub motor 19, as best shown in FIG. 2, is centered upon stationary axle 60 secured to rear yoke means 84. Wheel 13 rotates upon said axle. Suitable electrical features are surroundingly built upon the axle to cause it to function as the stator component 72 of an electric motor. A rotor member 61, affixed to the spokes 62 of said wheel, closely embraces stator 72. When electrical current is supplied to stator 72, wheel 13 is caused to rotate. The speed of such rotation is dependent upon pulses of electrical current supplied by said electronic controller. During braking, as provided by said electronic controller, hub motor 19 functions as a generator that feeds electrical current to battery 20. In alternative embodiments, an auxiliary electric motor 21 of conventional design may be employed in addition to or in place of said hub motor, and may be connected to a hub transmission 24 and engine 18 by chain drive 36, as shown in FIG. 4, or may be connected to jackshaft 24 by chain 38.

Suitable electronic controllers are available from the Crystalyte Company of China as Models 4840; 3640; 4820; 3620; 4825 and 3625; and controllers by Kelley Controller of China as Models KEB48221, KEB48301, KEB48401, KEB72331, KEB72451 and KEB72601. By pressing said momentary braking control button 54, the driver reverses the output polarity of the electronic controller. Such action, when employed with said hub motor, causes braking of the vehicle with simultaneous generation of electricity which is regeneratively fed to battery 20. Said momentary braking control button is preferably positioned to function in conjunction with a conventional hand brake control.

It has been found, however, that the rapid change in polarity applied to the hub motor in the course of braking produces a twisting force great enough to deform or break axle 60. In order to ameliorate said twisting force, a shock-absorbing assembly 65 is preferably installed in interactive relationship between axle 60 and framework 11. An embodiment of said shock-absorbing assembly is exemplified as comprised of axle-immobilizing means 66 which may be a steel block welded to or otherwise secured to axle 60, and having affixed thereto, as by bolting, an elongated flat spring 68 which extends to an upward distal extremity. Said distal extremity is attached to securing means such as bar 74 joined to a portion of framework 11 such as rear yoke means 84. The effect of the spring is to permit slight but sufficient rotative movement of the axle to prevent distortional twisting thereof.

An embodiment of transmission system 50 particularly adapted for use with the embodiment of the vehicle of this invention that employs a hub motor, is exemplified in FIGS. 5 and 6. It includes a jack shaft 29 having a continuously variable transmission (CVT) assembly 34 that outputs to sprocket and chain assembly 35 which drives rear wheel 13. A conventional bicycle type gear shift assembly 80 may be interactively disposed between chain assembly 35 and wheel 13. The CVT assembly permits variation of torque supplied to wheel 13. Alternative transmission systems may also be employed.

Pedaling mechanism 16 is intended to be operated by the driver at about 100 rpm and is connected to speed increasing means in the form of a chain and sprocket assembly 39 which provides a 4 to 1 increase in output rpm. This results in a final output of about 1600 rpm. Chain and sprocket assembly 39 terminates in a sprag-type free wheeling clutch 41 associated with jack shaft 29. Said clutch adds the pedal-produced power to the engine-produced power when the pedal-produced rpm equals the engine-produced rpm. By virtue of the aforesaid construction, the power outputs of engine 18 and pedaling mechanism 16 are accumulatively added to the power supplied by said batteries. Pedaling may be selectively done by the driver for increased acceleration or hill climbing, or merely for exercise.

The motorcycle embodiment of the vehicle of this invention, as shown in FIG. 4 has essentially the same features as the tricycle embodiment, with the exception of the wheel configuration, the steering control system and the positioning of the pedaling mechanism rearwardly of the front wheel.

While particular examples of the present invention have been shown and described, it is apparent that changes and modifications may be made therein without departing from the invention in its broadest aspects. The aim of the appended

Having thus described my invention, what is claimed is:

1. A tricycle vehicle comprised of a framework elongated upon a center axis between front and rear extremities, paired freely rotating front wheels equidistantly spaced about said axis, a single rear wheel vertically centered upon said axis and rotatable upon a horizontally oriented axle, a rechargeable storage battery, and seating means for a driver, said vehicle being propelled by power provided by a controlled combination of pedaling action by the driver, an internal combustion engine, and an electric hub motor having stator and rotor components associated with said axle, said power being conveyed to said rear wheel which thereby propels the vehicle.

2. The vehicle of claim 1 wherein said axle is stationary by virtue of securement to said framework, and said rear wheel rotates upon said stationary axle.

3. The vehicle of claim 2 wherein said stator component is affixed to said axle, said rotor component embraces said stator component, and said wheel is fixedly associated with said rotor component, whereby electrical power supplied to said hub motor produces rotation of said wheel.

4. The vehicle of claim 3 further comprising an electronic controller which, in a first mode of function regulates the amount of electrical power routed to said motor, and in a second mode of function reverses polarity, causing said motor to produce a braking effect on the vehicle with attendant generation of electricity which is fed to said battery.

5. The vehicle of claim 4 wherein shock-absorbing means are associated with said axle to minimize twisting force applied to said axle as a result of switching between said first and second modes of function.

6. The vehicle of claim 1 further equipped with steering means which facilitate hand operation of all control features of said vehicle, thereby allowing the driver's feet to provide said pedaling action.

7. The vehicle of claim 6 wherein chain and sprocket gearing means are provided to increase the rotational speed of said pedaling mechanism to match the rotational speed provided by said engine.

8. The vehicle of claim 7 wherein free-wheeling clutch means are provided to couple the rotational force produced by said pedaling mechanism with the rotational force produced by said engine.

9. A vehicle which accommodates a seated driver and extends upon a longitudinal center axis between front and rear extremities of a rigid framework that secures a rear wheel centered upon said axis at said rear extremity and adapted to rotate upon a horizontally oriented axle equipped with an electric hub motor, and a powertrain comprised of:

a) a rechargeable storage battery which supplies electrical power to said motor, b) an electronic controller which, in a first mode of function regulates the amount of electrical power routed to said motor, and in a second mode of function causes the motor to produce braking of the vehicle with attendant generation of electricity which is fed to the battery, c) a pedaling mechanism operable by said driver to produce motive power, d) a gasoline engine which produces motive power, and e) a transmission system which accumulates the power from said pedaling mechanism and engine, and causes said accumulated power to drive said rear wheel to propel the vehicle.

10. The vehicle of claim 9 further provided with shock-absorbing means associated with said axle to ameliorate the consequences of torque force received by said axle during braking.

* * * * *